M. J. NEARY.
PLATFORM SCALE.
APPLICATION FILED MAY 2, 1916.
1,229,310.
Patented June 12, 1917.
2 SHEETS—SHEET 2.
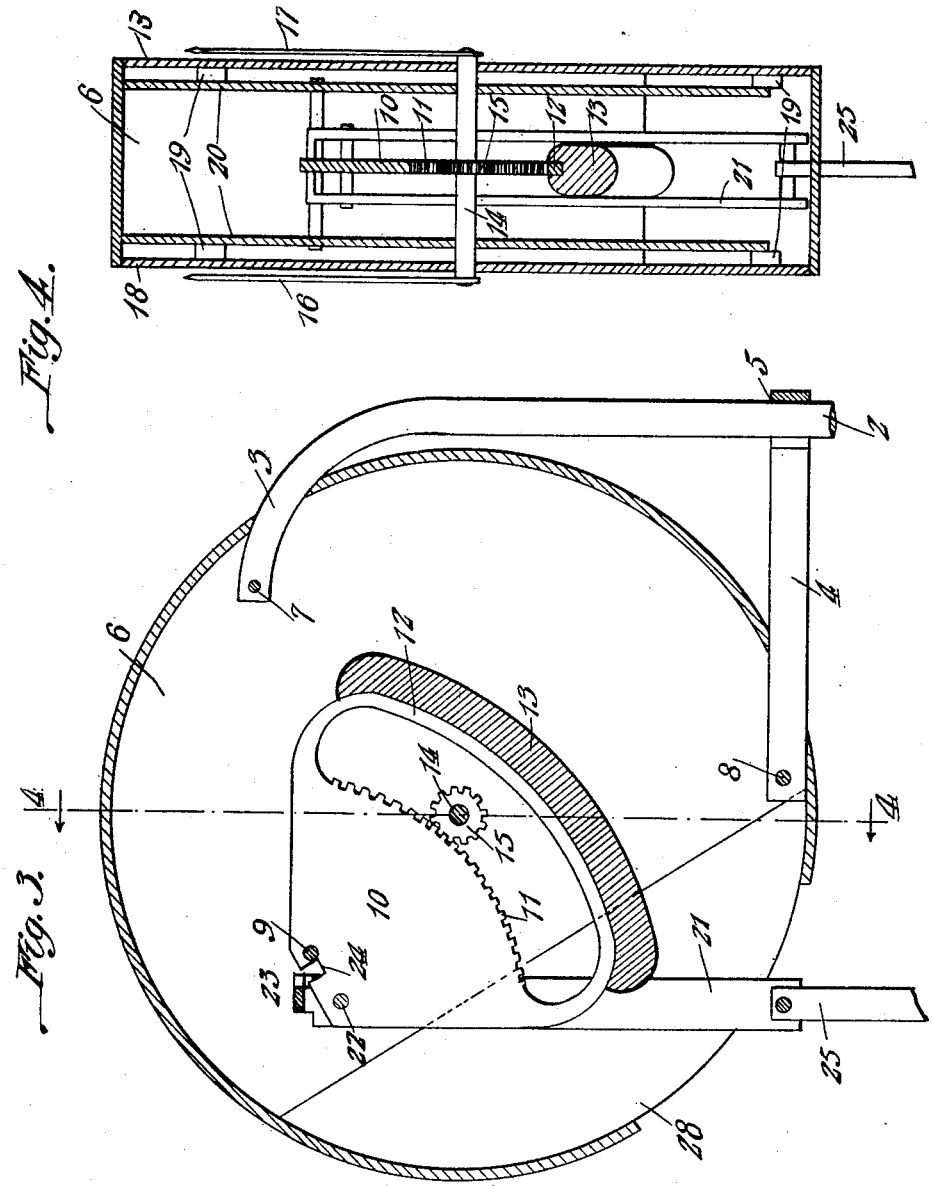
Michael J. Neary,
Inventor
By Geo. P. Kimmel.
Attorney

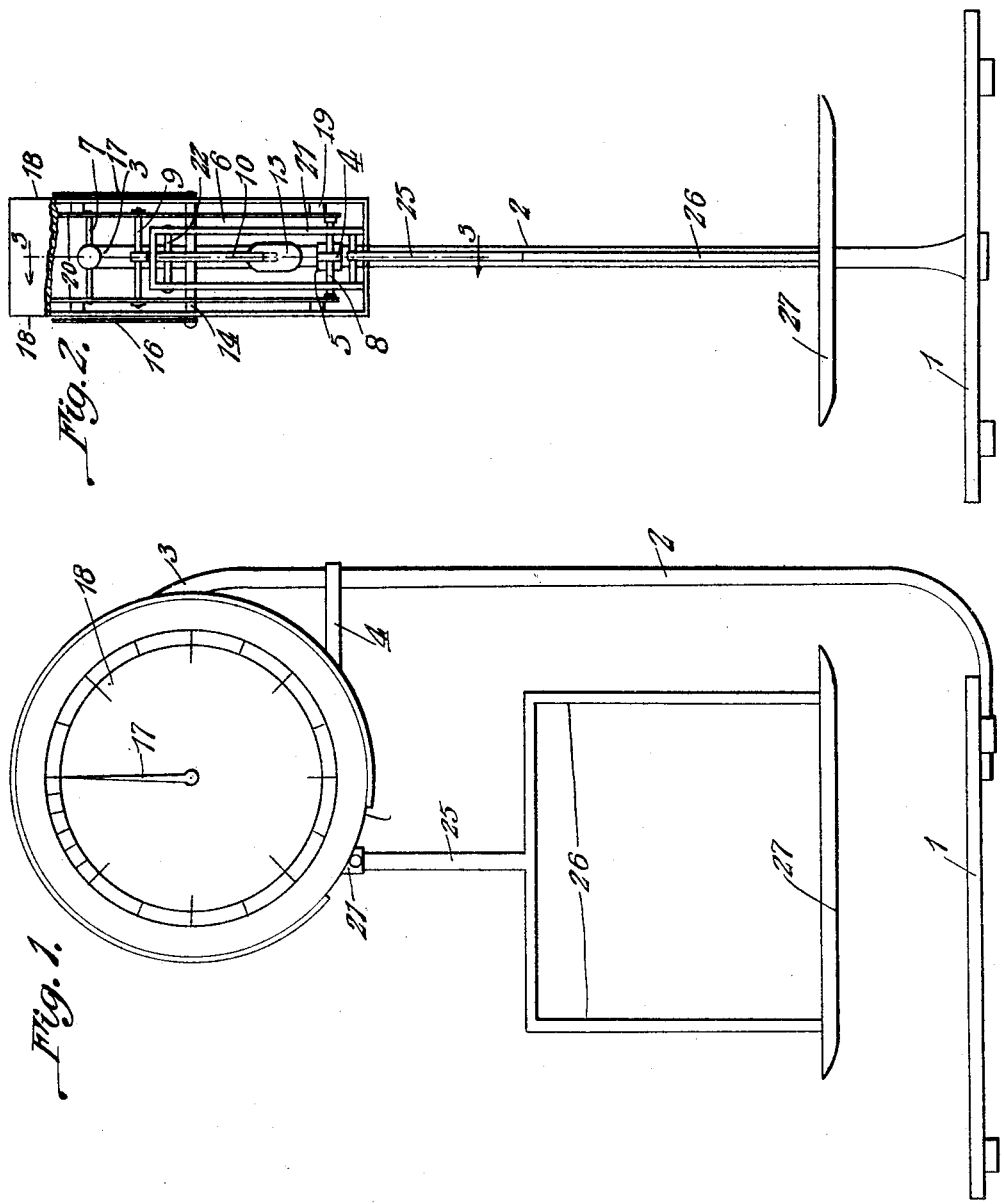

UNITED STATES PATENT OFFICE.

MICHAEL J. NEARY, OF VICTORIA, BRITISH COLUMBIA, CANADA.

PLATFORM-SCALE.

1,229,310.   Specification of Letters Patent.   Patented June 12, 1917.

Application filed May 2, 1916. Serial No. 94,912.

*To all whom it may concern:*

Be it known that I, MICHAEL J. NEARY, a subject of the King of Great Britain, residing at Victoria, in the Province of British Columbia, Canada, have invented certain new and useful Improvements in Platform-Scales, of which the following is a specification.

The present invention relates to weighing scales and more particularly to that class of scales known as platform scales.

An object of my invention is to provide an improved platform scale of light and durable construction from which there is an entire absence of springs which are the primary cause of the inaccuracies which exist at times in the spring scales now in use.

Another object of my invention is to provide a scale of the class described in which the structure employed is simple and cheap to manufacture, there being no complicated and expensive lever mechanism associated with the scale.

Other objects and advantages to be derived from the use of my invention will appear from the following detail description and the claims, taken with an inspection of the accompanying drawings, in which—

Figure 1 is a side elevation of a scale embodying the improvements of my invention, Fig. 2 is an end elevational view thereof, a portion of the casing being broken away to show the interior working parts, Fig. 3 is an enlarged vertical sectional view taken on the line 3—3 of Fig. 2, looking in the direction of the arrows, and Fig. 4 is a transverse sectional view taken on the line 4—4 of Fig. 3, looking in the direction of the arrows.

Referring more particularly to the drawings, in which similar characters of reference designate like and corresponding parts throughout the various views, 1 designates the base of my improved scale from which extends a suitable standard 2, the upper extremity of which is curved inwardly as at 3 to form a supporting arm for the scale mechanism. A brace 4 is fastened to the standard 2 as at 5 and extends inwardly, a circular housing 6 being supported as at 7 and 8 by means of the curved arm 3 and the brace 4, respectively.

The weighing mechanism of my improved scale is mounted within the housing 6 and comprises preferably a shaft 9 mounted eccentrically of the housing and carrying a segmental gear 10 having the teeth 11 and a curved weight supporting arm 12 on which is mounted the counter-weight 13. A second shaft 14 is mounted concentrically of the housing and carries a pinion 15 thereon which meshes with the teeth 11 of the segmental gear 10. Indicating hands 16 and 17 are carried on the free extremities of the shaft 14 and are adapted to move across dials 18 carried on the opposite sides of the housing 6 by means of blocks 19. The side walls of the housing are designated 20 and the shaft 9 hereinbefore described is mounted in said walls.

A supporting yoke 21 substantially U-shaped in configuration is pivoted on a pin 22 extending through the gear 10 and at a point eccentrically to the shaft 9, the upper portion of the yoke being reduced as at 23 to form a stop adapted for engagement in a stop recess 24 formed in the segmental gear 10. Carried on the lower end of the yoke 21 between the spaced arms thereof I pivotally connect a suspending frame 25 which is provided with spaced arms 26 carrying the platform 27 of the scale, said platform being adapted, of course, to receive the objects to be weighed. The peripheral wall of the housing 6 is provided with an opening 28 through which the yoke 21 is adapted to operate.

In operation, an object to be weighed is placed upon the platform 27, and the platform will consequently be depressed against the action of the weight 13 and through the segmental gear 10 and pinion 15 the hands 16 and 17 will be caused to move about the scales 18, and the scales being properly graduated will indicate the proper weight. Various modifications of the principle involved in my invention may be made, such as placing the platform above the dials, however, I prefer the form of my invention herewith illustrated. It will be noted that there is a total absence of springs and complicated lever mechanism in my invention, and that the accuracy of the device is unfailing.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as claimed.

What I claim as new and desire to secure by Letters-Patent is:—

1. In a platform scale, a base, a standard thereon, a housing on said standard having a shaft therein, said shaft having a pinion mounted thereon, a segmental gear pivotally mounted in said housing and meshing with said pinion, a weight carried by said segmental gear, a yoke pivotally associated with said segmental gear, said yoke having a platform associated therewith, a movement limiting means associated with said yoke and said segmental gear.

2. In a platform scale, a base, a standard thereon, a housing on said standard, a shaft concentrically mounted in the housing, a pinion mounted on said shaft, a shaft eccentrically mounted in said housing and the segmental gear mounted thereon for engagement with said pinion, a yoke pivotally associated with the segmental gear, a platform pivotally connected with the said yoke, there being a recess formed in the segmental gear providing a movement limiting means for the said platform, the yoke being reduced at its upper portion to engage the said recess.

3. In a platform scale, a base, a standard thereon flexed at its upper end, a housing carried by said standard, a brace member connected with the housing and said standard, a segmental gear having a weighted portion extending parallel to the segmental gear teeth, and a pinion meshing with said gear and a platform pivotally carried by the segmental gear and pendant therefrom to receive the object to be weighed.

In testimony whereof I affix my signature hereto.

MICHAEL J. NEARY.

Copies of this patent may be obtained for five cents each, by addressing the "Commissioner of Patents, Washington, D. C."